United States Patent [19]

Booman et al.

[11] 4,170,135

[45] Oct. 9, 1979

[54] COAXIAL CAVITY FOR MEASURING LEVEL OF LIQUID IN A CONTAINER

[75] Inventors: Glenn L. Booman, Nesconset, N.Y.; Frank R. Phelps, Arco, Id.

[73] Assignee: The United States of America as represented by the United States Department of Energy, Washington, D.C.

[21] Appl. No.: 945,926

[22] Filed: Sep. 26, 1978

[51] Int. Cl.² ............................................. G01F 23/28
[52] U.S. Cl. .............................. 73/290 R; 73/304 C
[58] Field of Search ............ 73/290 R, 290 V, 304 C

[56] References Cited

U.S. PATENT DOCUMENTS

| | | | |
|---|---|---|---|
| 2,584,128 | 2/1952 | Hildyard | 73/290 V |
| 3,391,547 | 7/1968 | Kingston | 73/304 C |
| 3,447,374 | 6/1969 | Cohn | 73/290 R |
| 3,807,231 | 4/1974 | Spaw | 73/290 R |

Primary Examiner—S. Clement Swisher
Attorney, Agent, or Firm—Dean E. Carlson; Frank H. Jackson; Jerold B. Schnayer

[57] ABSTRACT

A method and means for measuring the level of a liquid in a container. A coaxial cavity having a perforated outer conductor is partially submerged in the liquid in the container wherein the liquid enters and terminates the annular region of the coaxial cavity. The fundamental resonant frequency of the portion of the coaxial cavity which does not contain liquid is determined experimentally and is used to calculate the length of the liquid-free portion of the coaxial cavity and thereby the level of liquid in the container.

15 Claims, 4 Drawing Figures

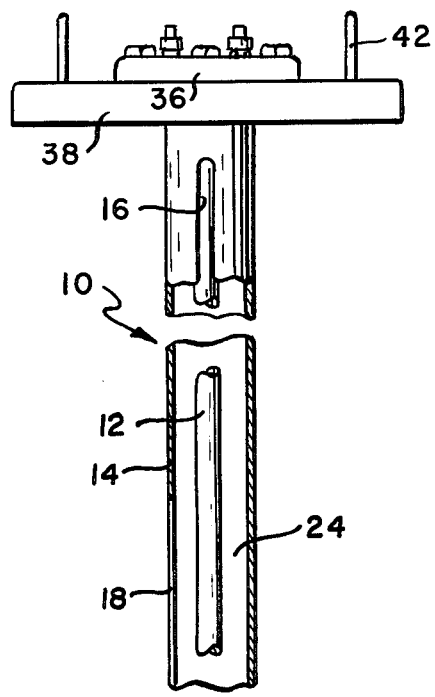
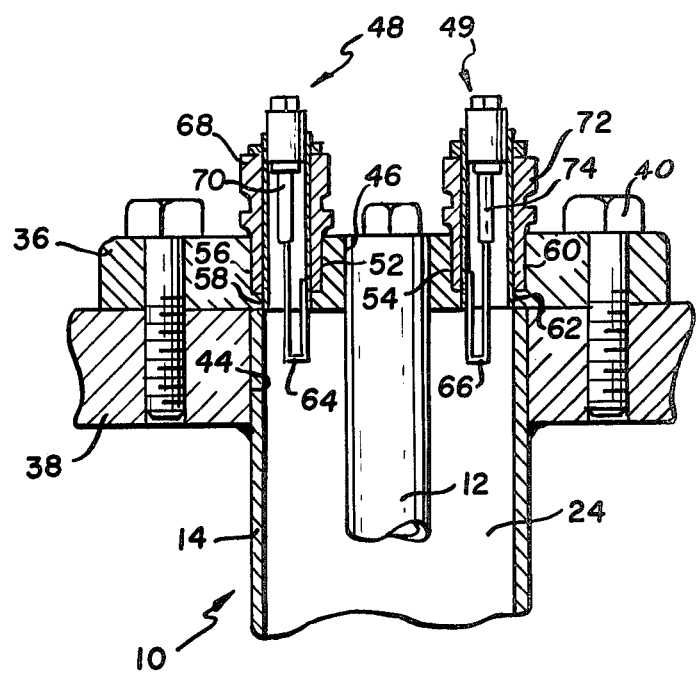
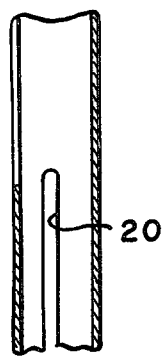
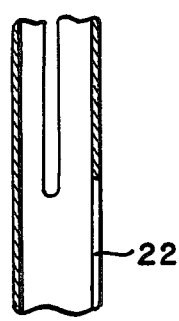
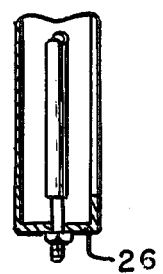
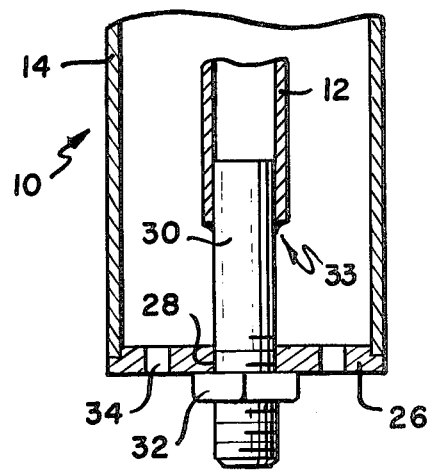

COAXIAL CAVITY FOR MEASURING LEVEL OF LIQUID IN A CONTAINER

CONTRACTUAL ORIGIN OF THE INVENTION

The invention described herein was made in the course of, or under, a contract with the UNITED STATES DEPARTMENT OF ENERGY.

BACKGROUND OF THE INVENTION

This invention relates to a method and means for measuring the level of a liquid in a container. More particularly, a coaxial cavity having a perforated tubular outer conductor is partially submerged in the liquid in the container so that liquid enters and terminates a portion of the annular region of the coaxial cavity. The fundamental resonant frequency of the portion of the coaxial cavity which does not contain liquid is determined experimentally and is used to calculate the length of the liquid-free portion of the coaxial cavity, and thereby the level of the liquid in the container.

It is extremely important from a safety standpoint to have accurate measuring devices for monitoring the level of liquid radioactive waste in large storage containers. Due to the highly radioactive nature of the liquid being stored a reliable measuring device is needed to insure against leaks or theft of the tanks' potentially dangerous contents.

One type of measuring device typically used to measure the level of liquid in a container which is well known to those skilled in the art is floats suspended within the liquid in the container. These floats can be connected to the outside of the container by mechanical linkage.

Another type of measuring device typically used in chemical processing plants is pneumatic bubble probes. These bubble probes can be connected to a pair of differential pressure transducers which give the data necessary to derive the level of the fluid in the container. In most applications this is a reliable approach, difficulty being encountered only in the case of solution near saturation which can cause the pneumatic bubble probes to clog.

One particular processing plant which uses pneumatic bubble probes as described above is the Idaho Chemical Processing Plant which is part of the Idaho National Energy Laboratory owned by the Department of Energy and located 50 miles west of of Idaho Falls, Idaho. The processing plant has a tank farm which contains several underground liquid-waste-storage containers. The containers are used to store a highly radioactive acidic solution which is in an intermediate step of reprocessing. It has been determined that a second independent measuring system is needed for monitoring the level of liquid in the storage containers. Safety considerations, in addition to the possibility of the loss of tank level information due to probe clogging, make it desirable that the second system not use pneumatic bubble probes.

SUMMARY OF THE INVENTION

This invention is directed to a method and means for measuring the level of a liquid in a container. A coaxial cavity having a perforated tubular outer conductor is partially submerged in the liquid in the container so that the liquid enters and terminates a portion of the annular region of the coaxial cavity. Energy from a variable-frequency RF source is injected into the liquid-free portion of the annular region of the coaxial cavity. The output-power of the cavity is monitored while the frequency of the RF power source is varied to determine several frequencies at which maximum or minimum output-power levels occur. These frequencies are used to calculate the fundamental resonant frequency of the cavity. The fundamental resonant frequency is used to calculate the length of the portions of the cavity which do not contain liquid and from this length the level of the liquid within the container is calculated.

It is therefore an object of the present invention to provide an accurate and reliable device and method for measuring the level of a liquid in a container.

It is a further object of the invention to provide a device and method for constantly monitoring the level of liquid in the container.

BRIEF DESCRIPTION OF THE DRAWINGS

Other objects and advantages of the invention will become apparent upon reading the following detailed description and upon reference to the drawings in which:

FIG. 1 is a partial sectional side view of a coaxial cavity.

FIG. 2 is a partial sectional side view of the bottom portion of the coaxial cavity.

FIG. 3 is a partial sectional side view of the top portion of the coaxial cavity.

DETAILED DESCRIPTION OF THE INVENTION

Figure 4:
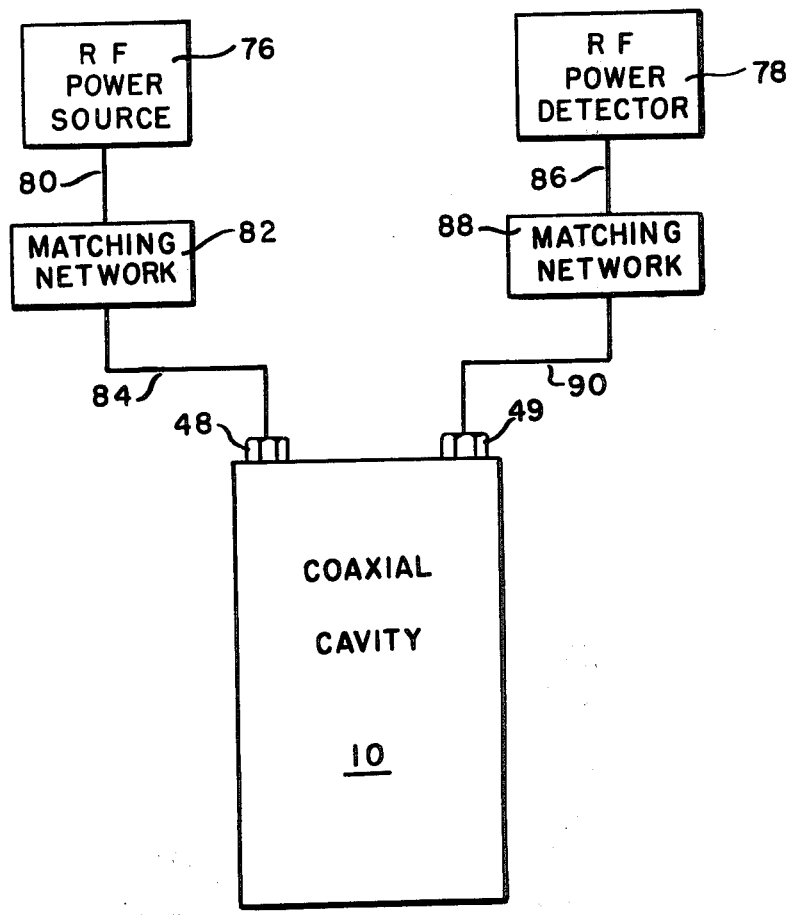
FIG. 4 is a schematic diagram of a device for measuring the level of liquid in a container.

A device for measuring the level of liquid in the liquid waste storage containers of the Idaho Chemical Processing Plant will be used to illustrate a preferred embodiment of the invention.

FIG. 1 illustrates coaxial cavity 10 which has a tubular right-circular-cylindrical inner conductor 12 surrounded by a coaxial tubular right-circular-cylindrical outer conductor 14. Inner conductor 12 is approximately 20 feet in length and has an outside diameter of one inch. Outer conductor 14 is also approximately 20 feet in length and has an inside diameter of four inches. Slots 16, 18, 20 and 22 extend through outer conductor 14, run vertically down outer conductor 14, are each approximately five feet in length, and are uniformly located 90 degrees about and at different locations along the length of outer conductor 14. The slots allow fluid located in the area surrounding coaxial cavity 10 to enter and terminate a portion of annular region 24 which is located between outer conductor 14 and inner conductor 12.

FIG. 2 illustrates the bottom portion of coaxial cavity 10. Inner conductor 12 is centered within outer conductor 14 at the bottom of coaxial cavity 10 as follows. End plate 26 which is a circular disk is affixed by means such as welding to the bottom edge of outer conductor 14. Hole 28 is located in the center of end plate 26. Retention rod 30 extends through hole 28 and is secured to end plate 26 by nut 32. The distal portion 33 of retention rod 30 extends along the center of outer conductor 14, and is seated in the center of inner conductor 12. Distal portion 33 is soldered to inner conductor 12, thereby centering inner conductor 12 within outer conductor 14. End plate 26 also contains holes 34 located about hole 28 which allow liquid to enter annular region 24.

FIG. 3 illustrates the top portion of coaxial cavity 10. Disc-like upper flange 36 is mounted coaxial with and on top of disc-like lower flange 38. Lower flange 38 has a larger diameter than upper flange 36. The flanges are bolted together by four evenly spaced bolts 40 of which only three are visible in FIG. 3. Lift rings 42 (see FIG. 1) extend perpendicularly from and are attached to the top face of lower flange 38. Lift rings 42 are located diametrically about the center of lower flange 38 and are provided for handling coaxial cavity 10.

Turning once again to FIG. 3, inner conductor 12 and outer conductor 14 are connected to upper flange 36 and lower flange 38 as follows. Circular hole 44, located in the center of lower flange 38, has a diameter which is equal to the outer diameter of outer conductor 14. The top portion of outer conductor 14 is seated in hole 44, butts against the bottom face of upper flange 36, and is welded in place. Circular hole 46 which is located in the center of upper flange 36 is coaxial with hole 44 and has a diameter which is equal to the outer diameter of inner conductor 12. The top portion of inner conductor 12 is seated in hole 46, the top edge of inner conductor 12 is flush with the upper face of upper flange 36, and inner conductor 12 is welded in place.

Attached to upper flange 36 are 50-Ohm connectors 48 and 49 which are standard coaxial connectors well known in the art. Connectors 48 and 49 are seated respectively within holes 52 and 54. Holes 52 and 54 are located at diametrically opposite points about the center of outer conductor 14 and extend through upper flange 36 into annular region 24. Connector 48 is soldered into hole 52 as follows. Hole 52 has a right-circular-cylindrical upper portion 56 and coaxial right-circular-cylindrical lower portion 58. Upper portion 56 has a larger diameter than lower portion 58. The end of the connector 48 is seated within upper portion 56 and butts against the edge of lower portion 58. Connector 48 is soldered into hole 24 as follows. Hole 54 has an upper portion 60 and a lower portion 62 which have the same dimensions as upper portion 56 and lower portion 58. The end of connector 49 is seated within upper portion 60 and butts against the lower edge of lower portion 62.

Coupling loops 64 and 66 are connected to connectors 48 and 49 and extend down into annular region 24 as follows. Connector 48 has a main body 68 and a center conductor 70. Coupling loop 64 forms a square loop which extends into annular region 24 and is connected at one end to center conductor 70 and at the other end is soldered against the inner wall of the main body 68. Similarly, connector 49 has a main body 72 and a center conductor 74. Coupling loop 66 also forms a square loop which extends into annular region 24 diametrically opposite coupling loop 64 and is connected at one end to center conductor 74 and at the other end is soldered against the inner wall of main body 72. Coupling loop 64 is used as an antenna to couple RF energy into annular region 24 and coupling loop 66 is used as a current-sensing loop to detect the intensity of the RF magnetic field at the top portion of coaxial cavity 10.

FIG. 4 shows a schematic diagram of the device for measuring the level of liquid in a container. RF power supply 76 and RF power detector 78 are connected to coaxial cavity 10 as follows. The output of RF power supply 76 is connected by line 80 to impedance-matching network 82, which is connected by line 84 to connector 48 of coaxial cavity 10. Impedance-matching network 82 is provided to match the load of RF power supply 76 to the load of connector 48. The input of RF power detector 78 is connected by line 86 to impedance-matching network 88, which is connected by line 90 to connector 49 of coaxial cavity 10. Impedance-matching network 88 is provided to match the load of RF power detector 84 to the load of connector 49. It is noted that lines 80, 84, 86, and 90 are all coaxial cables.

As noted before, the device described above was designed for monitoring the level of liquid in the liquid-waste-storage-containers of the Idaho Chemical Processing Plant. Although the storage containers are not shown in the figures, each storage container has a circular hole in its top. The diameter of these holes is slightly larger than the outside diameter of outer conductor 15. Coaxial cavity 10 is connected to a storage container in the following manner. Lift rings 42 are used to lift coaxial cavity 10, which is inserted vertically into the interior of the storage container through the hole in the top of the storage container until the bottom of lower flange 38 rests on the top of the storage container about the hole. As noted the length of coaxial cavity 10 is chosen so that at least a portion of the end of coaxial cavity 10 will be submerged when the storage container contains the lowest level of liquid that is desired to be monitored. The reason for this is that a measurement of the height of fluid in the storage tank can only be made when at least a portion of coaxial cavity 10 is submerged.

The following steps are peformed to determine the level of liquid in a storage container. RF power source 28 is activated, thus injecting RF energy into annular region 26 through coupling loop 64. The RF energy propagates down annular region 24 until the liquid-air junction, where a portion of the RF energy is transmitted through the surface of the liquid. A majority of the RF energy, however is reflected back up annular region 24 thus creating a standing-wave pattern in annular region 24. The standing-wave pattern has a magnetic and an electric field component which are 180° out of the phase. In the preferred embodiment only the magnetic-field compnent is measured.

With a constant power output the frequency of RF power source 28 is varied while the power output of coaxial cavity 10, which is the standing-wave pattern, is monitored on RF power detector 32. RF power detector 32 measures the magnetic-field field strength at the top portion of coaxial cavity 10 as detected by coupling loop 66. At maximum or minimum magnetic-field output levels as measured on RF power detector 32, the input frequency of RF power source 28 is to a good approximation equal to an $n_{th}$-harmonic resonant frequency of the liquid-free portion of coaxial cavity 10. The $n_{th}$-harmonic frequencies are equal to n times the fundamental resonant frequency of the liquid-free portion of coaxial cavity 10, where n is an integer. The fundamental resonant frequency is the lowest frequency at which resonance occurs in the cavity. Several different $n_{th}$-harmonic resonant frequencies are determined and statistical analysis, which is well known in the art, is applied to these values to approximate the fundamental resonant frequency of the cavity. To a good approximation the length of the liquid-free portion of coaxial cavity 10 is equal to the velocity of light divided by the fundamental resonant frequency. To determine the height of liquid in the liquid container, the length of the liquid-free portion of coaxial cavity is subtracted from the distance between the top annular region 24 of coaxial cavity 10 and the bottom of the container vessel. This value can be used to calculate the amount of liquid in the storage container.

The calculations for determining the level of liquid in the storage container can be done manually as described above. However, in practice a computer is connected to and operates RF power supply 28 and RF power detector 32. The computer is programmed to vary automatically the frequency of RF power supply 28 while monitoring RF power detector 32, and from these values calculates several $n_{th}$-harmonic resonant frequencies, the fundamental resonant frequency, and the length of the liquid-free portion of coaxial cavity 10. The computer is programmed to repeat continuously the above procedure, thus constantly monitoring the level of liquid in the storage container.

It is noted that 10 resistance temperature detectors (not shown in the figures) are uniformly spaced within the hollow center of inner conductor 12. These detectors are used to measure the temperature of various levels of the liquid in the storage container. The reason for this is as follows. The dimensions of the container and therefore the distance, $L_T$, from the top of coaxial cavity 10 to the bottom of the container varies with the temperature of the container. The temperature of the container depends upon and is related to the temperature of the liquid within the container. The temperature of the liquid is not uniform throughout the tank. It has been determined experimentally how the temperature of the liquid at various levels in the container effect the value of $L_T$. The value of $L_T$ can be calculated by monitoring the temperature at various levels of the container and correcting the value of $L_T$ to compensate for these thermal effects.

It is also noted that in order to keep an accurate record of the quantity of liquid in a container the thermal effects on the dimensions of the container, and the density of the liquid within the container must also be taken into consideration.

In the preferred embodiment of the invention the output power of coaxial cavity 10 is monitored at the top of annular region 24 by coupling loop 66. The output power of coaxial cavity 10 is monitored at this point merely for convenience. The output power of coaxial cavity 10 could be monitored anywhere along the liquid-free portion of annular region 24. Further, although in the preferred embodiment the magnetic field is monitored, the electric field could be monitored for minimum and maximum output levels, the only difference being that the electric field is 180° out of phase with the magnetic field.

For the preferred embodiment, coupling loop 64 is used to inject energy into coaxial cavity 10 and a separate coupling loop, coupling loop 66, is used to monitor the output power of coaxial cavity 10. It is possible to use the same coupling loop to inject energy into and monitor the output power of coaxial cavity 10. However, if this were done, appropriate coupling devices well known in the art would be needed to separate the input and output signals.

The invention can be used to measure the level of any liquid in a container as long as the liquid has a different propagation coefficient from that of air. As long as the liquid does have a different propagation coefficient then some RF energy will be reflected from the liquid-air junction in annular region 24 and thus set up a standing-wave pattern. It is this standing-wave pattern which is monitored for minimum and maximum power levels by RF power dectector 84.

Where possible all parts of coaxial cavity 10 are fabricated from stainless steel. This is done because of the highly corrosive nature of the contents of the storage container.

Tests have been performed to determine the accuracy of the invention when connected to a liquid waste storage container of the Idaho Chemical Processing Plant. The storage containers have a 50-foot diameter and there are approximately 50 gallons of liquid per inch of height. Statistical averaging of successive level estimates produce a resultant estimate with a standard deviation of less than 0.001 inch.

The embodiments of the invention in which an exclusive property of privilege is claimed are defined as follows:

1. A method for measuring the level of liquid in a container utilizing a coaxial cavity having an inner conductor coaxially suspended within a tubular outer conductor, the outer conductor having perforations to allow liquid surrounding the coaxial cavity to enter and terminate a portion of an annular region between the inner conductor and the outer conductor, the steps in the method comprising:
    partially submerging the coaxial cavity in the liquid in the container so that liquid enters and terminates a portion of the annular region between the inner conductor and the outer conductor, leaving a liquid-free portion in the annular region;
    injecting a sinusoidal electric field into the liquid-free portion of the annular region;
    varying the frequency of the electric signal while simultaneously monitoring the output power level in the liquid-free portion of the annular region for maximum and minimum output-power levels, the $n_{th}$ harmonic resonant frequencies of the liquid-free position of the coaxial cavity are equal to the frequencies of the electric signal at which maximum or minimum output power levels occur; and
    determining the level of liquid in the container from the $n_{th}$ harmonic resonance frequencies and the dimensions of the container according to a predetermined scheme.

2. The method of claim 1 wherein the step of determining the level of liquid in the container comprises:
    determining the fundamental resonant frequency $F_o$ of the liquid-free portion of the coaxial cavity, according to the following relationship: $F_o = n \times F_n$ where n is an integer; and
    determining the length L of the liquid-free portion of the coaxial cavity according to the following relationship: $L = c/F_o$ where c equals the speed of light.

3. The method of claim 2 wherein the step of determining the level and quantity of liquid in the container further comprises:
    determining the level $L_w$ of liquid in the container, according to the following relationship: $L_w = L_T - L$ where $L_T$ equals the distance from the top of the liquid-free portion of the coaxial cavity to the bottom of the tank.

4. The method according to claim 3 which further comprises measuring the temperature of liquid in the tank and adjusting the values of $L_T$ and $L_w$ to compensate for the thermal effects of the temperature of the liquid and the tank.

5. The method according to claim 4 wherein the axis of the coaxial cavity is perpendicular to the surface of the liquid in the container.

6. The method according to claim 5 wherein the electric signal is injected at the top of the liquid-free portion of the annular region of the coaxial cavity.

7. The method according to claim 6 wherein the output power in the liquid-free portion of the coaxial cavity is monitored by detecting the strength of the magnetic field at the top of the liquid-free portion of the coaxial cavity.

8. A device for measuring the level of liquid in a container comprising:
- a coaxial cavity hving an inner conductor coaxially suspended within a tubular outer conductor, the outer conductor having perforations to allow liquid surrounding the coaxial cavity to enter and terminate a portion of an annular region between the inner conductor and outer conductor;
- means for supporting the coaxial cavity within the container so that a bottom portion of the coaxial cavity is partially submerged in the liquid, leaving a liquid-free portion in the top of the annular region;
- means for generating a variable-frequency sinusoidal electric signal;
- means for injecting the electric signal into the liquid-free portion of the annular region connected to the means for generating and the coaxial cavity; and
- means for detecting an output power level in the liquid-free portion of the annular region connected to the coaxial cavity.

9. The device of claim 8 wherein the coaxial cavity is long enough so that at least a portion of the coaxial cavity will be submerged in the liquid when the container contains the lowest level of liquid that is desired to be monitored.

10. The device of claim 9 which further includes;
means for monitoring the temperature of the liquid and the container.

11. The device of claim 10 wherein the coaxial cavity is suspended in the container with an axis of the coaxial cavity perpendicular to a top surface of the liquid in the container.

12. The device of claim 11 which further includes a computer which is connected to the means for generating, the means for detecting, and the means for monitoring, and which is programmed to calculate the level of liquid in the container.

13. The device of claim 12 wherein the outer conductor and the inner conductor of the coaxial cavity are made of stainless steel.

14. The device of claim 13 wherein the inner conductor of the coaxial cavity is a tubular member and the means for monitoring the temperature is located in the center of the inner conductor.

15. The device of claim 14 wherein the means for injecting comprises a first coupling loop connected to the means for generating and the coaxial cavity, and which is located at the top of the liquid-free portion of the annular region; and wherein the means for detecting comprise a second coupling loop connected to the coaxial cavity, and which is located at the top of the liquid-free portion of the annular region.

* * * * *